United States Patent [19]

Howell

[11] Patent Number: 4,636,907
[45] Date of Patent: Jan. 13, 1987

[54] ARCLESS CIRCUIT INTERRUPTER

[75] Inventor: Edward K. Howell, Simsbury, Conn.

[73] Assignee: General Electric Company, New York, N.Y.

[21] Appl. No.: 753,832

[22] Filed: Jul. 11, 1985

[51] Int. Cl.⁴ .............................................. H01H 9/42
[52] U.S. Cl. ........................................ 361/13; 361/8; 361/11; 307/137
[58] Field of Search ...................... 361/2, 3, 5, 6, 8, 9, 361/10, 11, 13; 307/134, 135, 137

[56] References Cited

U.S. PATENT DOCUMENTS

| | | | |
|---|---|---|---|
| 3,430,063 | 2/1969 | Webb | 361/6 X |
| 4,001,742 | 1/1977 | Jencks et al. | 335/173 |
| 4,005,340 | 1/1977 | Härtel | 361/8 X |
| 4,266,259 | 5/1981 | Howell | 361/97 |
| 4,307,428 | 12/1981 | Yanabu et al. | 361/3 X |
| 4,420,784 | 12/1983 | Chen et al. | 361/13 X |
| 4,438,472 | 3/1984 | Woodworth | 361/2 X |
| 4,550,356 | 10/1985 | Takahashi | 361/9 |
| 4,583,146 | 4/1986 | Howell | 361/13 |

FOREIGN PATENT DOCUMENTS 1138147  10/1962  Fed. Rep. of Germany .......... 361/3

Primary Examiner—A. D. Pellinen
Assistant Examiner—Derek S. Jenning
Attorney, Agent, or Firm—Richard A. Menelly; Walter C. Bernkopf; Fred Jacob

[57] ABSTRACT

Arcless circuit interruption from metallic contacts is accomplished by the combination of a solid state current interrupter with a control circuit and an impedance circuit. The impedance circuit diverts the contact circuit current through the solid state current interrupter prior to initiating contact separation. The contacts then open without sufficient current transfer to establish an arc.

22 Claims, 6 Drawing Figures

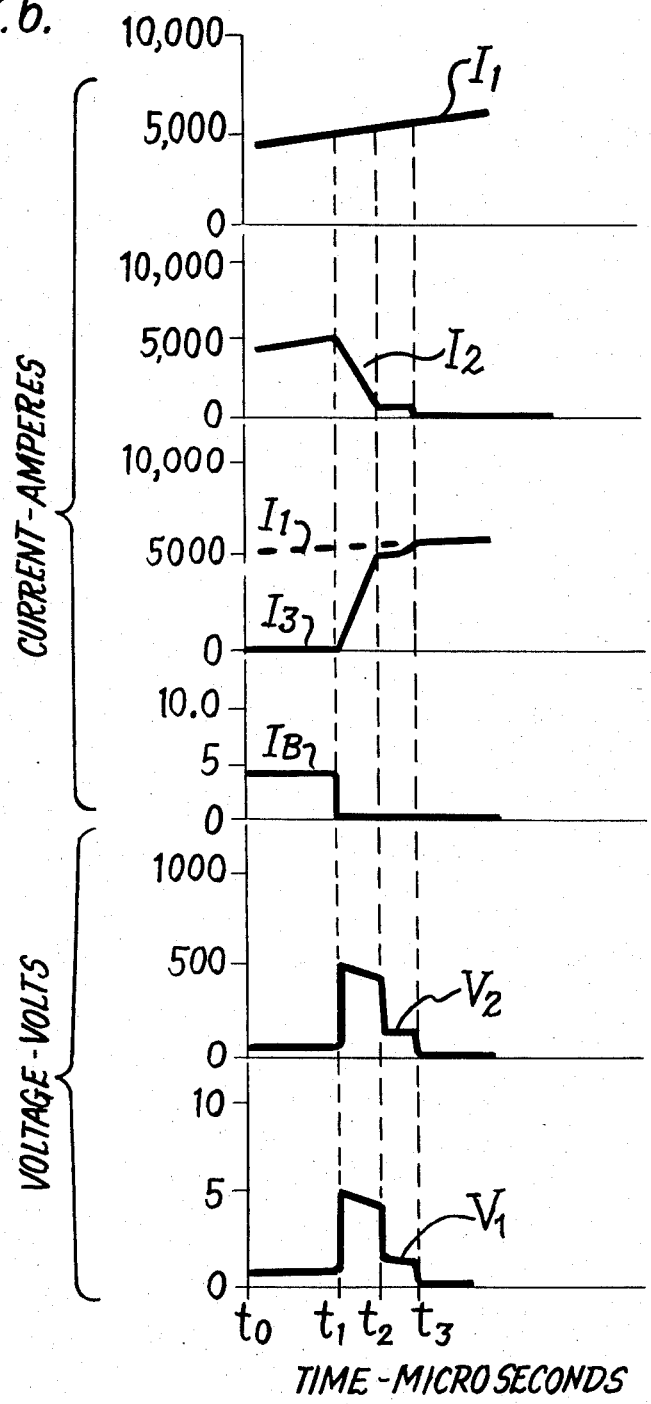

ARCLESS CIRCUIT INTERRUPTER

BACKGROUND OF THE INVENTION

Several solid state circuit interruption devices have proven feasible for substantially reducing the magnitude of the arc that occurs between separating contacts within a protected circuit. The devices generally comprise a combination of semiconductor elements that are selected to transfer the interrupted current away from the separating contacts immediately upon contact separation.

One such device is described within U.S. patent application Ser. No. 610,947 filed May 16, 1984 entitled "Solid State Current Limiting Interrupter" in the name of E. K. Howell. This device basically consists of the parallel combination of a voltage controlled element and a current controlled element connected across the separating contacts. Immediately upon contact separation, the current is transferred away from the contacts first to the current controlled element and then to the voltage controlled element. The time delay between the instant of contact separation and the transfer of current away from the contacts is within a few microseconds. seconds. The arc that occurs during this short time period has minimal effect on state-of-the-art contact materials. These materials generally comprise a combination of silver and tungsten or tungsten carbide. The silver provides excellent electrical conductivity between the contacts when in a closed configuration and the tungsten provides protection against sputtering of the contacts during the contact arcing.

U.S. patent application Ser. No. 665,841 filed Oct. 29, 1984 now U.S. Pat. No. 4,583,146 entitled "Fault Current Interrupter" in the name of E. K. Howell provides the combination of a positive temperature coefficient element with a voltage controlled element across the separating contacts to substantially reduce contact arcing U.S. patent application Ser. No. 681,478 filed Dec. 14, 1984 entitled "Circuit Interrupter Using Arc Commutation" in the name of E. K. Howell employs a zener diode and triac to transfer the current away from the separating contacts over to the voltage controlled device. All of the aforementioned Patent Applications, which are incorporated herein for reference purposes, exhibit some finite time delay between the time of contact separation and the transfer of current over to the solid state interruption circuit. Should the occurrence of an arc be completely eliminated such that the contacts can become separated without deleterious arcing effects, however brief, both the size of the contacts and the cost of contact materials can be substantially reduced. The purpose of this invention is to describe a circuit which completely eliminates the occurrence of an arc between separating contacts both under ordinary circuit conditions as well as upon the occurrence of an overload condition.

SUMMARY OF THE INVENTION

Arcless circuit interruption is provided by the combination of a control circuit, impedance circuit and a current interruption device. The impedance circuit diverts the current through a pair of separable contacts to the current interruption device prior to effecting opening of the contacts. The current transferring through the contacts upon the instant of separation is insufficient to establish a significant arc.

BRIEF DESCRIPTION OF THE DRAWINGS

FIG. 6 is a graphic representation of the component current waveforms and the control circuit voltage waveform on a common time axis.

DESCRIPTION OF THE PREFERRED EMBODIMENT

Figure 1:
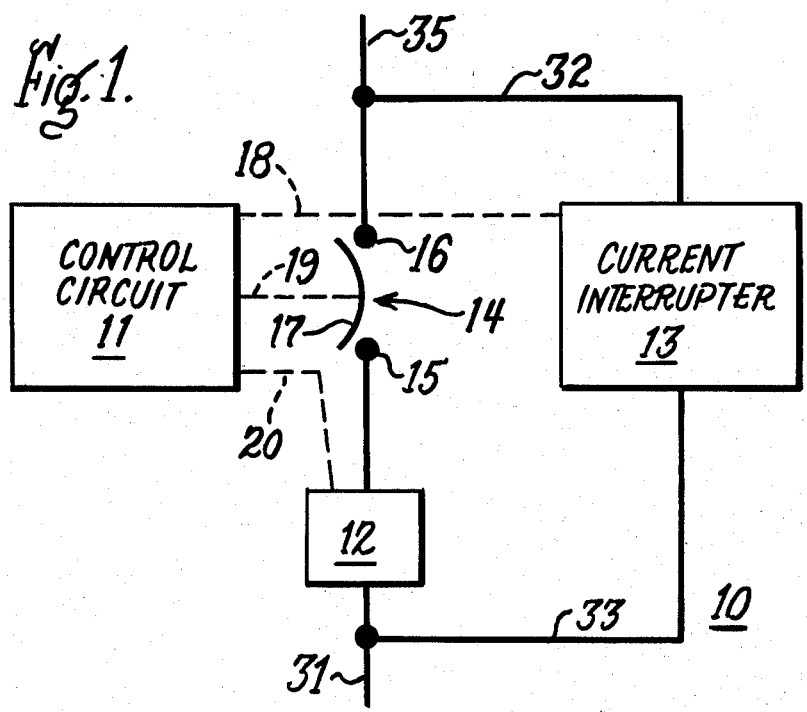
FIG. 1 is a diagrammatic representation of the arcless circuit interruption device according to the invention.

The arcless circuit interrupter of the invention is shown generally at 10 in FIG. 1 wherein a control circuit 11 is operatively connected by means of control line 20 with a controlled series impedance circuit 12, hereafter "impedance circuit", with a current interrupter 13 by means of control line 18 and with the bridging contact 17 of a pair of fixed contacts 15, 16 within switch 14 by means of control line 19. A current carrying conductor 35 within an electric circuit connects with a conductor 31 by means of the series combination of switch 14 and the impedance circuit 12. Normally, current flows through the circuit from conductor 35 through contacts 15, 16, 17 and the impedance circuit 12 which represents a low circuit impedance in the order of the electrical resistance of the contacts. The current interrupter 13 is of a sufficient high impedance so that negligble current flows through the current interrupter at the low voltage drop presented by the contacts and the impedance circuit. When it is desired to interrupt the circuit current, the impedance of the impedance circuit 12 is increased to divert the circuit current through the current interrupter 13. The impedance provided by the impedance circuit 12 must then be made quite large with respect to the impedance provided by the current interrupter 13, preferably an open circuit. The voltage across the impedance circuit increases with the impedance provided by the impedance circuit because of the inductance of the path through the current interrupter, the impedance circuit and the contacts. To protect the impedance circuit 12 from excessive voltage it is necessary to limit the voltage increase by clamping the voltage to a safe level, or by limiting the rate-of-change of voltage. Various switching devices can be employed within the impedance circuit to change the impedance and hence the voltage, such as gate turn-off thyristors, positive temperature coefficient resistors, bi-polar transistors and field effect transistors which will be described below in greater detail. The controlled rate of change of this voltage can be obtained from capacitors or from the switching devices by means of the control circuit 11 or can be structured within the switching device itself. Separate circuit elements can be used to limit this voltage such as varistors and zener diodes, either singly or in combination, with rate-of-change limiting. Additionally, an impedance matching transformer can be inserted between the impedance circuit and the electric circuit depending upon the properties of the particular switching device selected within the impedance circuit. The impedance circuit 12 must continuously carry normal circuit current, such as 500 amperes at a ten millivolt drop, for example, which results in a continuous power dissipation of 5 watts. When the switching device within the impedance circuit is switched to a high voltage state, the voltage drop then increases to approximately 20 volts to provide effective transfer of the circuit current to the current interrupter 13 within a few microseconds. The switching device consists of semiconductor elements which generally exhibit trade-off relationships between conducting voltage drops and blocking voltage capability. A low voltage drop is usually associated with a low blocking voltage for a particular device. Most available switching devices however, do exhibit sufficiently high voltage drops with sufficiently high blocking voltage capabilities that an impedance matching transformer is useful in matching the switching devices to the electric circuits. The current interrupter 13 must immediately accept the circuit current when switched, but since it does not carry continuous circuit current, it may exhibit a higher voltage drop such as in the order of a few volts. After the circuit current transfers away from the contacts 15-17 through the current interrupter 13 over conductor 32, the contacts are then opened by a signal from the control circuit 11 to a switchable operating mechanism, such as that described within U.S. Pat. No. 4,001,742 in the names of C. L. Jencks et al., which patent is incorporated herein for reference purposes. After the contacts have separated a sufficient distance, in the order of 0.005 to 0.010 inches, which is sufficient to withstand the open circuit voltage without breakdown, the current interrupter 13 is raised to a high voltage state in excess of the circuit voltage to cause the circuit current to rapidly decay to zero and to complete the interruption of the circuit current. If the characteristics of the current interrupter 13 are such that the circuit current reaches a non-zero level, an auxiliary switch (not shown) may be used to complete the interruption process. The auxiliary switch should also be employed if it is desired to automatically reclose switch 14 after a predetermined period of time.

The current interrupter 13 can comprise a solid state switch current limiting interrupter such as described within aforementioned U.S. patent application Ser. No. 610,947 or solid state circuit interrupters, such as described within aforementioned U.S. patent application Ser. No. 665,841 now U.S. Pat. No. 4,583,146. The electrodynamic circuit interrupter described within U.S. patent application Ser. No. 674,810 filed Nov. 26, 1984 now U.S. Pat. No. 4,598,187 also in the name of E. K. Howell wnerein magnetically repulsed parallel-spaced contact arms are employed as auxillary contact carriers can also be employed within the current interrupter 13 in accordance with the teachings of this invention. The function of the current interrupter 13 connected across the switch 14 and the impedance circuit 12 by means of conductors 32, 33 is to provide a parallel low resistance path for the circuit current when the switch 14 is to be opened to substantially reduce the current through the switch contacts, 15-17 when the contacts are separated. As described earlier, the impedance circuit 12 diverts the current away from the switch 14 over to the current interrupter 13 until the contacts 15-17 become separated. When the contacts have separated a sufficient distance to prevent the occurrence of an arc, the circuit is interrupted within the current interrupter 13. As is well known in the circuit breaker industry, the more rapid the contacts can be separated upon command, the lower the electric energy that must be handled by the circuit breaker components. A means of rapidly separating the bridging contact 17 from the fixed contacts 15, 16 is described within U.S. patent application Ser. No. 684,307 filed Dec. 20, 1984 now abondoned and entitled "High Speed Contact Driver For Circuit Interruption Device", which Application is incorporated herein for reference purposes.

Figure 2:
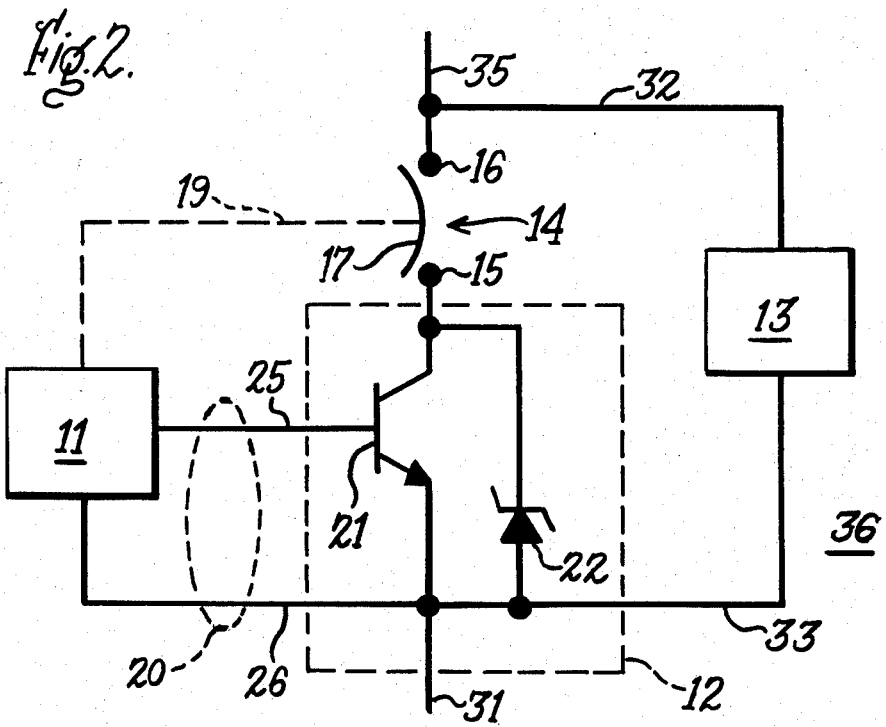
FIG. 2 is a diagrammatic representation of one embodiment of the arcless circuit interruption device of FIG. 1 employing a bipolar transistor.
Figure 3:
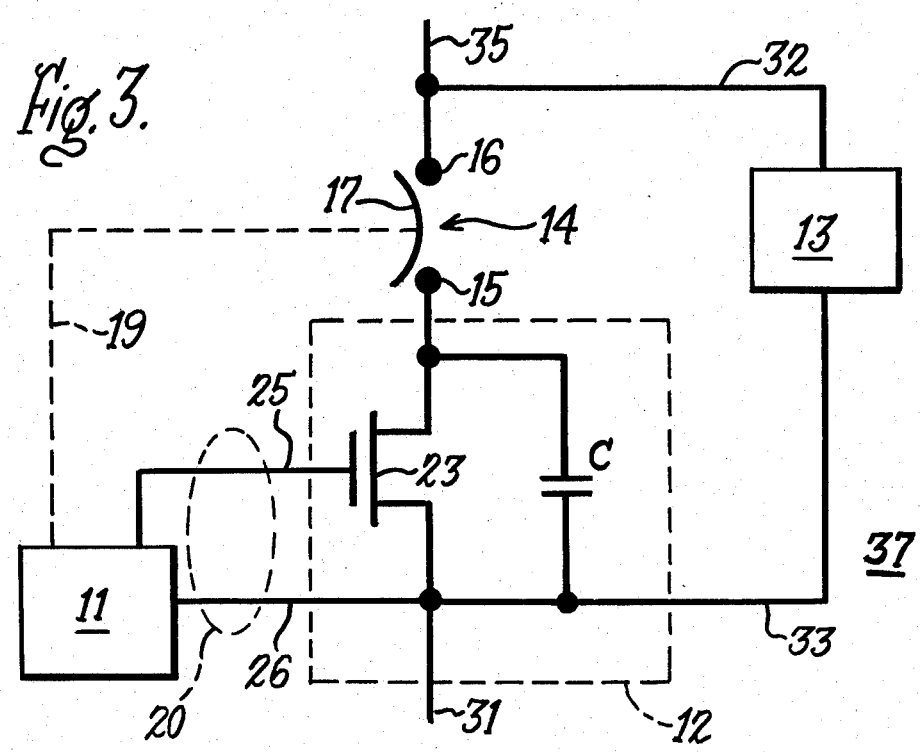
FIG. 3 is a diagrammatic representation of a second embodiment of the arcless circuit interruption device of FIG. 1 employing a Field Effect Transistor paralleled by a capacitor.
Figure 4:
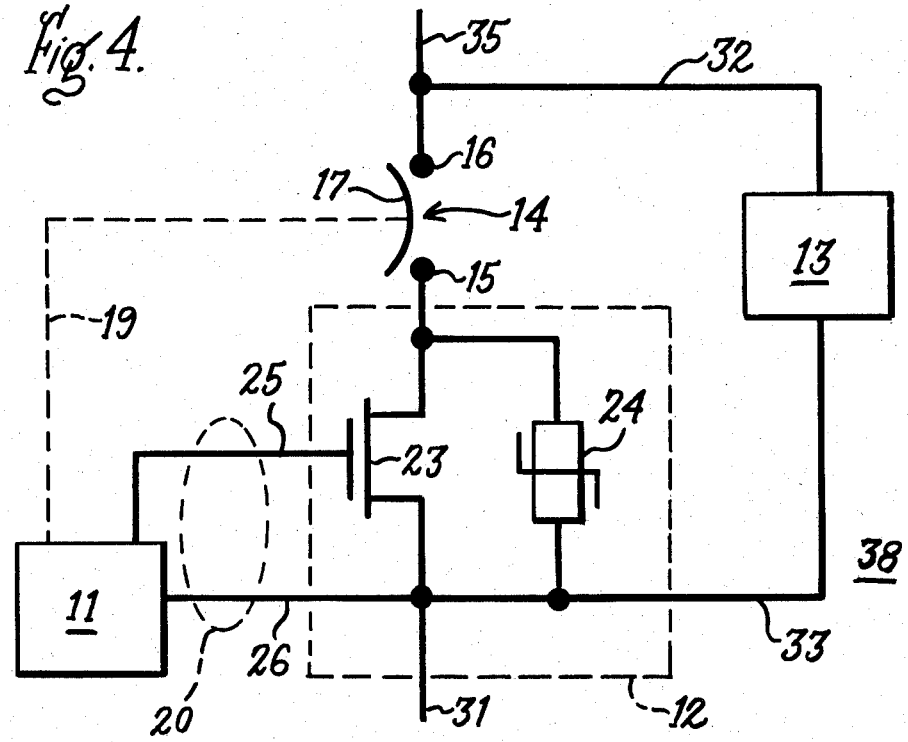
FIG. 4 is a diagrammatic representation of a further embodiment of the arcless circuit interruption device of FIG. 2 with a metal oxide varistor across the Field Effect Transistor.

A simple impedance circuit 12 is provided by the combination of a bipolar transistor 21 and zener diode 22 within the arcless circuit interruption device 36 of FIG. 2. The transistor being a high current low voltage device when base drive is applied over conductor 25 from control circuit 11, rapidly switches to a higher, zener diode voltage when base drive is removed to transfer the circuit current away from switch 14 over to the current interrupter 13. The control line 20 from control circuit 11 can comprise a plurality of conductors depending upon the circuit elements within the impedance circuit 12. The conductors within the control line 20, such as conductors 25, 26 in FIGS. 2-4 are indicated accordingly. Electrical connection between the control circuit 11 and the impedance circuit 12 by conductor 25 is completed by means of conductor 26. Once the circuit current has transferred to the current interrupter 13 the bridging contact 17 is then separated from fixed contacts 15, 16 by operation of the control line 19 to interrupt the low amount of residual current through impedance circuit 12 and switch 14 after the circuit current has been transferred to the current interrupter 13. The zener diode 22 ensures that the voltage across the emitter and collector of the bipolar transistor remains at a safe value and can be eliminated in some applications by proper control of the transistor turn-off time.

The arcless circuit interrupter 37 depicted in FIG. 3 utilizes an impedance circuit 12 consisting of a field effect transistor (FET) 23 with a capacitor C coupled across the drain and source. Conductor 25 supplies bias to the gate from the control circuit 11 which is electrically connected with the impedance circuit by means of conductor 26. The FET has a very high impedance, in the range of megohms, approaching an open circuit when no bias is provided to the gate, and a very low impedance approaching a short, when gate bias is applied. This effectively provides two current paths from conductor 35 namely, that through the switch 14 and the FET to conductor 31 when bias is applied to the gate, and through conductor 32, the current interrupter 13 and conductor 33 when bias is removed from the gate to interrupt the current. The capacitor serves to limit the FET voltage to a safe value and can be eliminated by proper control of the turn-off time of the FET.

The arcless circuit interrupter 38 of FIG. 4 is similar to that of FIG. 3 with a metal oxide or silicon carbide varistor 24 substituted for the capacitor C for the same purpose. In some circuit applications the varistor is not required. The control circuit 11 is connected with the gate of the FET over line 25 and with the impedance circuit 12 over conductor 26. The current immediately transfers to the current interrupter 13 when the FET resistance increases prior to opening switch 14. As described earlier, the current interrupter 13 can interrupt the current in the manner described within the Howell patent application Ser. No. 610,947 filed May 16, 1984 by selection of a voltage dependent element having a clamping voltage higher than system voltage followed by operation of an auxiliary switch if so desired.

Figure 5:
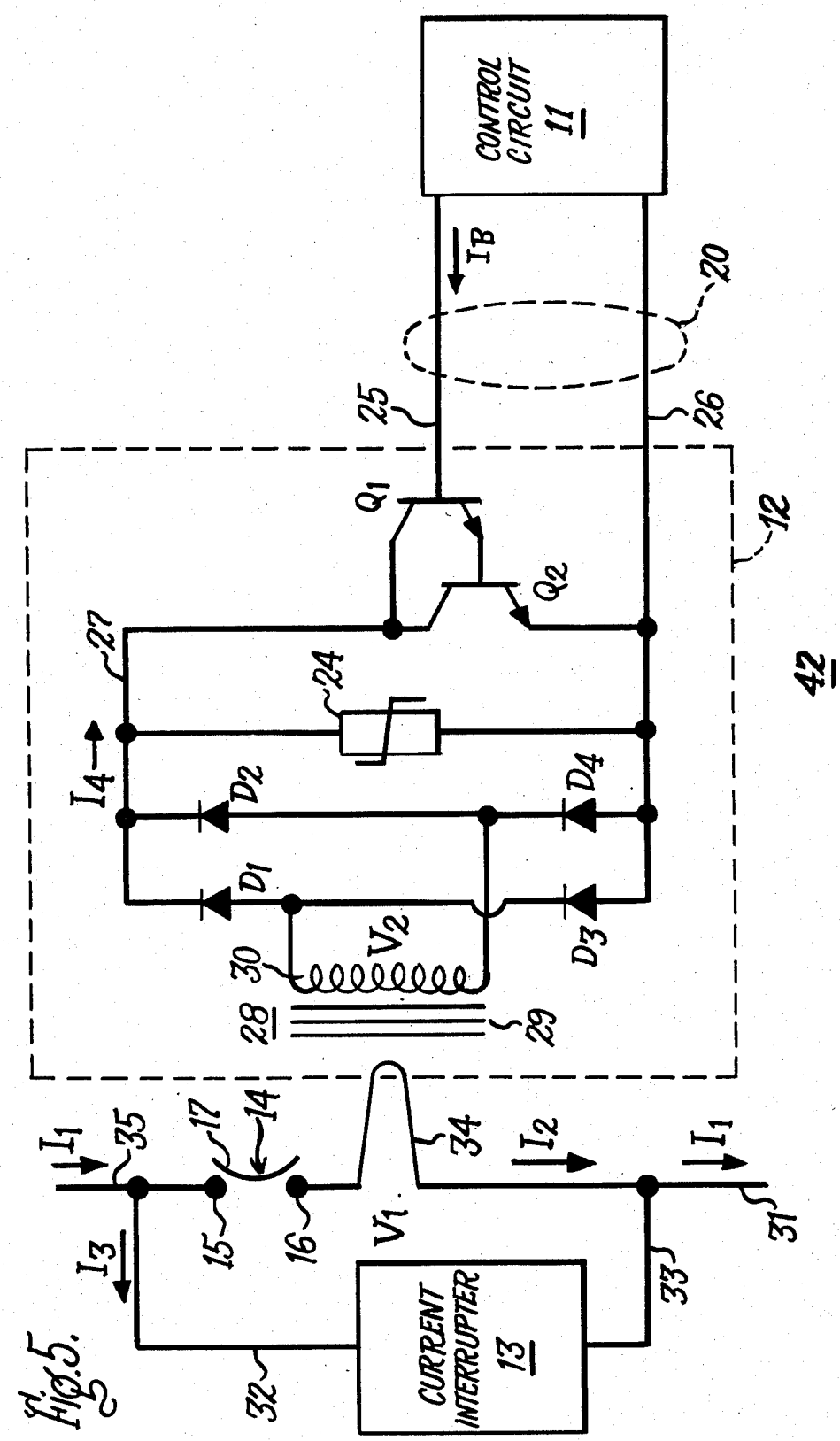
FIG. 5 is a diagrammatic representation of the arcless circuit interruption device of FIG. 1 employing a current transformer in combination with a darlington bipolar transistor for switching the current to the current interrupter.

A lower impedance is achieved by use of the impedance circuit 12 employed within the arcless circuit interrupter 42 depicted in FIG. 5. Similar reference numerals will be employed, where possible. The control circuit 11 of this embodiment is depicted as basically consisting of a transistor base control circuit connected with the base of a first transistor $Q_1$ over conductor 25 and with the emitter of a second transistor $Q_2$ over conductor 26. The transistors $Q_1$, $Q_2$ are arranged as a Darlington Power Transistor. The control circuit provides base drive to $Q_1$ which is connected by common collector and by emitter-base to $Q_2$ as shown. When both $Q_1$ and $Q_2$ are on, the voltage drop across conductors 26, 27 is in the order of a few volts. A voltage controlled element such as the metal oxide varistor 24, is connected across the conductors and across the secondary winding 30 of a transformer 28 through a bridge rectifier consisting of diodes $D_1$–$D_4$. The transformer includes a core 29 and a single turn primary winding 34 which is arranged is series with the power bus 35. Switch 14 includes a bridging contact 17 which connects between a pair of fixed contacts 15, 16 to conduct the current $I_1$ flowing through the power bus. When $Q_1$, $Q_2$ are conducting, the output voltage across the secondary winding 30 and the metal oxide varistor 24 is at a low value. When the base drive to transistor $Q_1$ is turned off, the base current $I_B$ drops to zero and both $Q_1$ and $Q_2$ turn off allowing the output voltage of the secondary winding 30 to increase to the clamping voltage of the metal oxide varistor 24 which is substantially higher than the voltage across the secondary winding when $Q_1$, $Q_2$ are conducting. For purposes of this embodiment, the transformer 28 is provided with a turns ratio of 100 to 1 and the metal oxide varistor 24 has a 500 volt clamping voltage. The current through the primary winding of the transformer is designated $I_2$ to distinguish between the circuit current $I_1$ through the power bus 35. The circuit current passing through the current interrupter 13, which is connected in parallel across switch 14 by means of conductors 32, 33, is designated as $I_3$. In order to provide for arcless interruption across the contacts 15, 16 when separated, the current $I_1$ is diverted through the current interrupter 13 prior to initiating contact separation. This results in only a slight magnetizing current remaining in the contacts which is insufficient to generate a significant arc between the contacts. As long as $Q_1$, $Q_2$ are on, the voltage across the metal oxide varistor 24 is substantially lower than the clamping voltage and no current passes through the metal oxide varistor. When the transistor base control unit 11 turns off the base current to transistor $Q_1$, the base current $I_B$ rapidly drops to zero. The voltage $V_2$ across the output of the secondary winding 30 and the metal oxide varistor 24 rapidly increases to the clamping voltage of the metal oxide varistor which in turn develops a voltage $V_1$ across the primary winding 34. The voltage across the primary diverts the circuit current away from contacts 15, 16 to conductor 32 and the current interrupter 13. The current interrupter 13 can be a solid state switch having the components described within the aforementioned Howell patent application Ser. No. 610,947, for example.

The transistor base control function 20 of control unit 11 can simply be in response to an element for sensing the output current $I_4$ of the transformer 28, or the transformer can be incorporated within the sophisticated trip unit described within U.S. Pat. No. 4,266,259 entitled "Long Time and Short Time Overcurrent Processor For Circuit Breaker Static Trip Units" in the name of E. K. Howell. It is within the scope of this invention to employ a digital logic equivalence of the Howell trip unit and to employ a microprocessor for operating the switch 14, the current interrupter 13, as well as the impedance circuit 12 if so desired. Although the control circuit 11 within this embodiment is herein described for the arcless interruption of power fault current within a protected circuit, the control circuit of this invention finds application wherever arcless interruption may be desired, such as within explosive environments when the contacts are required to be opened for other than overload protection purposes.

The relationship between the currents involved within the circuit of FIG. 5 is graphically illustrated in FIG. 6 as a function of time expressed in microseconds for nominal values of voltage and current. For the transformer 28 having a turns ratio of 1 to 100, when the base current $I_B$ is turned off at $t_1$, the circuit current $I_1$ has a value of 5000 amps such that a secondary current $I_4$ of 50 amps is generated within the impedance circuit. The voltage $V_2$ across the secondary winding 30 rises from 3 volts to the 500 volt clamping voltage of the metal oxide varistor 24 which reflects a rise from 30 millivolts to 5 volt potential across the single turn primary winding at $V_1$. This 5V volt potential is sufficient to divert the circuit current $I_1$ over to the solid state switch 13 as indicated at $I_3$ and to cause the circuit current through the contacts $I_2$ to decrease to a low value at time $t_2$. At time $t_3$, contacts 15, 16 are opened in the manner described within the latter referenced Howell patent to interrupt the residual magnetizing current $I_2$ through the contacts, causing the output voltage $V_2$ across the secondary winding and the voltage $V_1$ across the primary winding to rapidly drop to zero at which time $I_3$ becomes equal to $I_1$. The circuit current $I_1$ is indicated in dashed lines for comparison to the current $I_3$ now passing through the solid state switch. At some time later than $t_3$ when the contact gaps of switch 14 can support the required voltage, the solid state switch 13 becomes operative, the current $I_3$ flows through the voltage controlled element within the solid state switch and the high voltage rapidly drives the current to zero since the systems voltage is lower than the clamping voltage of the voltage controlled element.

It is thus seen that by diverting the current away from a pair of separable contacts prior to interrupting current through the contacts and directing the current through a properly designed current interrupter the contacts can be separated without the occurrence of any significant arc whatsoever.

Having described my invention, what I claim as new and desire to secure by Letters Patent is:

1. A circuit interrupter comprising:
    a pair of separable contacts connected in series within an electric circuit;
    first and second circuit means connected within said electric circuit for preventing arc formation between said contacts upon separation;

said second circuit means connected in series with said contacts for causing a circuit current to transfer to said first circuit means prior to separating said contacts;

said first circuit means connected across the series combination of said contacts and said second circuit for conducting circuit current away from said contacts for a predetermined period of time before interrupting said circuit current; and operating means for separating said contacts while said first circuit means is conducting said circuit current.

2. The circuit interrupter of claim 1 wherein said second circuit means includes transistor means whose impedance is increased from a first value to a higher second value to cause circuit current to transfer to said first circuit means.

3. The circuit interrupter of claim 2 including a voltage dependent element having a predetermined clamping voltage for protecting said transistor.

4. The circuit interrupter of claim 1 wherein said second circuit means includes solid state elements whose impedance is increased from a first value to a higher second value to cause a circuit current to transfer to said first circuit means.

5. The circuit interrupter of claim 1 wherein said second circuit means comprises a variable impedance element for providing a first series impedance to said electric circuit for allowing said circuit current to pass through said separable contacts and for providing a second series impedance higher than said first series impedance to cause said circuit current to transfer to said first circuit means.

6. The circuit interrupter of claim 5 wherein said second circuit means includes a bipolar transistor wherein said bipolar transistor is turned on to provide said first series impedance and said bipolar transistor is turned off to provide said second series impedance.

7. The circuit interrupter of claim 5 wherein said second circuit means includes a field effect transistor wherein said field effect transistor is turned on to provide said first series impedance and said field effect transistor is turned off to provide said second series impedance.

8. The circuit interrupter of claim 3 wherein said voltage dependent element comprises a metal oxide or silicon carbide varistor.

9. The circuit interrupter of claim 6 or 7 wherein said second circuit means is connected with said electric circuit by a transformer.

10. The circuit interrupter of claim 1 further includes a control circuit means for operating said first circuit means, said second circuit means, and said operating means.

11. The circuit interrupter of claim 9 including a voltage dependent element connected across said transformer output winding.

12. The circuit interrupter of claim 11 wherein said voltage dependent element is connected across said transformer output winding through a rectifier.

13. The circuit interrupter of claim 9 wherein said transformer includes a single turn primary winding.

14. The circuit interrupter of claim 1 including means for initiating said transfer upon the occurrence of a predetermined current through said circuit.

15. A circuit interrupter comprising:

a pair of separable contacts within a protected circuit under control of an operating mechanism for interrupting predetermined current through said circuit;

a transformer having an input winding connected in series with said contacts having an output winding connected in parallel with a power transistor;

a solid state switch connected in parallel with the series connection of said contacts and said transformer for conducting said current away from said contacts and for transferring said current to a voltage dependent element for causing said current to decrease to a predetermined low value; and means for applying drive signal to said power transistor to keep said transformer output winding at a first voltage while said contacts are in a closed condition and for removing drive signal to said power transistor immediately prior to separating said contacts said contacts to increase said transformer output winding to a second voltage greater than said first voltge.

16. A method for providing circuit interruption comprising the steps of:

connecting a pair of separable contacts in series with first circuit means within an electric circuit;

arranging second circuit means across said contacts and said first circuit means;

operating said first circuit means for causing some of said circuit current to transfer to said second circuit means prior to opening said contacts;

opening said contacts to interrupt remaining current flow through said contacts; and operating said second current circuit means for decreasing said transferred circuit current to a predetermined low value.

17. The method of claim 16 including the step of providing a first voltage dependent element within said second circuit means and passing said circuit current through said first voltage dependent element to cause said transferred circuit current to decrease to said predetermined low value.

18. The method of claim 17 including the step of connecting said first circuit means to said electric circuit through a transformer.

19. The method of claim 18 including the step of connecting a power transistor across the secondary winding of said transformer.

20. The method of claim 19 including the step of providing base drive current to the base of said power transistor to turn on said power transistor and to keep said transformer output winding at a first predetermined voltage.

21. The method of claim 20 including the step of connecting the collector of a second power transistor to the collector of said power transistor and connecting the emitter of said second power transistor to the base of said power transistor, the base of said second power transistor being switchably connected to a source of base current.

22. The method of claim 21 including the step of connecting a rectifier between said current transformer secondary winding and said power transistor.

* * * * *

UNITED STATES PATENT AND TRADEMARK OFFICE
CERTIFICATE OF CORRECTION

PATENT NO. : 4,636,907

DATED : January 13, 1987

INVENTOR(S) : Edward K. Howell

It is certified that error appears in the above-identified patent and that said Letters Patent is hereby corrected as shown below:

Column 8, line 23, delete "said contacts" (first occurrence)

Signed and Sealed this

Thirty-first Day of March, 1987

*Attest:*

DONALD J. QUIGG

*Attesting Officer*  Commissioner of Patents and Trademarks